US012559319B2

(12) United States Patent
Lebkowski et al.

(10) Patent No.: US 12,559,319 B2
(45) Date of Patent: Feb. 24, 2026

(54) STABILIZED CARRIER BASKET TROLLEY, STABILIZED CARRIER BASKET TRANSPORTER SYSTEM AND METHOD OF STABILIZING A CARRIER BASKET IN A CARRIER BASKET TRANSPORTER SYSTEM

(71) Applicant: Franke Technology and Trademark Ltd, Hergiswil (CH)

(72) Inventors: Wojciech Lebkowski, Rumia (PL); Ireneusz Czapp, Reda (PL)

(73) Assignee: Franke Technology and Trademark Ltd, Hergiswil (CH)

( * ) Notice: Subject to any disclaimer, the term of this patent is extended or adjusted under 35 U.S.C. 154(b) by 98 days.

(21) Appl. No.: 18/736,658

(22) Filed: Jun. 7, 2024

(65) Prior Publication Data

US 2024/0409317 A1    Dec. 12, 2024

(30) Foreign Application Priority Data

Jun. 9, 2023    (EP) ..................................... 23178430

(51) Int. Cl.
*B65G 17/12* (2006.01)
*B65G 17/34* (2006.01)
*B65G 47/61* (2006.01)

(52) U.S. Cl.
CPC ........... *B65G 17/123* (2013.01); *B65G 17/34* (2013.01); *B65G 47/61* (2013.01)

(58) Field of Classification Search
CPC ...... B65G 17/123; B65G 17/34; B65G 17/18; B65G 54/02; B65G 47/61; B65G 35/00; B61B 13/127

USPC ................................................... 198/797, 801
See application file for complete search history.

(56) References Cited

U.S. PATENT DOCUMENTS

| | | | | |
|---|---|---|---|---|
| 4,957,188 | A * | 9/1990 | Bavis ..................... | B65G 21/22 |
| | | | | 186/14 |
| 5,101,963 | A * | 4/1992 | Skarlupka ............ | B65G 17/123 |
| | | | | 198/838 |
| 6,321,899 | B1 * | 11/2001 | Hannessen ............. | B65G 17/18 |
| | | | | 198/475.1 |

(Continued)

FOREIGN PATENT DOCUMENTS

| | | | |
|---|---|---|---|
| EP | 3533733 | B1 | 12/2022 |
| KR | 102107663 | B1 | 5/2020 |
| WO | 1981000393 | A1 | 2/1981 |

*Primary Examiner* — Mark A Deuble
(74) *Attorney, Agent, or Firm* — Volpe Koenig

(57) ABSTRACT

A stabilized carrier basket trolley for a transporter system, the trolley has two cars on the track, on a first side of a support plate and pivotable relative thereto. A distance between the cars changes during traversal of curves and a center of the trolley moves relative to the track towards the inside of a curve. A carrier basket is pivotably connected on the support plate and pivots about a pivot axis. The trolley includes a gear mechanism for actively compensating a moment acting on the carrier basket during traversal of curves that includes a drive wheel drivingly connected to a first gear rotatably mounted on the support plate, and a second gear, meshing with the first gear, non-rotatably connected to the carrier basket. The drive wheel comes into contact with a side of the track upon movement of the center of the trolley relative to the track.

18 Claims, 15 Drawing Sheets

(56) References Cited

U.S. PATENT DOCUMENTS

| | | | |
|---|---|---|---|
| 6,554,105 B2 * | 4/2003 | Brown | B65G 17/123 |
| | | | 186/41 |
| 7,708,135 B2 * | 5/2010 | Ellerth | A47F 10/06 |
| | | | 198/801 |
| 10,633,195 B2 * | 4/2020 | Gadliger | B65G 47/57 |
| 11,225,380 B2 * | 1/2022 | Czapp | B65G 17/485 |
| 12,172,842 B2 * | 12/2024 | Hagenbuch | B65G 47/57 |
| 12,280,959 B2 * | 4/2025 | Czapp | B65G 17/16 |
| 2004/0083684 A1 | 5/2004 | Schroeder et al. | |
| 2012/0043183 A1 | 2/2012 | Hannessen | |
| 2024/0083684 A1 * | 3/2024 | Czapp | B65G 17/123 |
| 2024/0132288 A1 * | 4/2024 | Sung | B65G 17/34 |

* cited by examiner

STABILIZED CARRIER BASKET TROLLEY, STABILIZED CARRIER BASKET TRANSPORTER SYSTEM AND METHOD OF STABILIZING A CARRIER BASKET IN A CARRIER BASKET TRANSPORTER SYSTEM

CROSS-REFERENCE TO RELATED APPLICATIONS

This application claims priority to European Patent Application No. EP 23178430.7, filed Jun. 9, 2023, which is incorporated herein by reference as if fully set forth.

TECHNICAL FIELD

The invention relates to a stabilized carrier basket trolley for motion on a track of a carrier basket transporter system according to the preamble of claim 1, said trolley comprising: a support plate; two cars for engaging said track, said track having a track width, said cars being arranged on a first side of the support plate and pivotable relative to the support plate, wherein a distance between said cars is subject to change during traversal of curves along the track, so that during operation a center of the trolley is able to move relative to a center line of the track by a measure towards the inside of a curve in the track; and a carrier basket arranged on a second side of the support plate opposite said first side, which carrier basket is pivotably connected to the support plate and free to pivot about a pivot axis that is normal with respect to a plane of the support plate.

The invention also relates to stabilized carrier basket transporter system and to a method of stabilizing a carrier basket in a carrier basket transporter system.

BACKGROUND

Such a carrier basket trolley is known from U.S. Patent Application Publication No. 2024/0083684 in the name the present applicant.

Furthermore, EP 3 533 733 A1 discloses another conveyor system with carrier baskets for the transport of packaged food products.

The disclosure in US 2024/0083684 is directed to a carrier basket support and stabilizing system for a carrier basket having increased weight carrying capacity that is transported along a conveyor having a pathway, i.e., said track. The system includes a plurality of cars, which may have wheels, configured to travel along the track or pathway, with at least some support groups including two of the cars having a carrier basket support connected thereto. Each said support group of two of the cars includes a first car and a second car. The carrier basket support has a support plate connected to the first car via a pivoting connection and connected to the second car by a pivoting and sliding connection such that the first and second cars are pivotable relative to the support plate and a distance between the first car and the second car can change during traversal of curves along the track or pathway. A support connection is located on the support plate configured for connection to a carrier basket on a side facing away from the track/pathway. The carrier basket has a back support or back plate, a product support surface extending generally transversely from the back support in a direction opposite to the pathway, and a mating connection on the back support that is connected to the support connection.

With this arrangement, the carrier basket is supported by two of the cars, providing a greater weight capacity than in the prior known system according to EP 3 533 733 A1 where the carrier basket was supported by a single car. This arrangement also allows for a change in the distance between the first and second cars in the curves and to compensate for the changing angles of the cars relative to one another in a horizontal plane as they traverse inner and outer curves in the track.

According to the prior art, the carrier baskets are pivotably attached to the cars and thus basically remain horizontally balanced under the influence of gravity. However, applicant has noted that during operation, when the cars moved through curves in the track, a residual moment may lead to a carrier basket swing, which in turn may entail a loss of transported goods, spillage of liquids and increased wear of the components used.

To further refine the known devices and systems there is a need for a stabilized carrier basket trolley as well as for a stabilized carrier basket transporter system and a method of stabilizing a carrier basket in a carrier basket transporter system that help to avoid carrier basket swing, thus preventing a loss of transported goods, spillage of liquids and increased component wear.

SUMMARY

It is the object of the present invention to provide such device, system and method.

This object is achieved by means of a stabilized carrier basket trolley for motion on a track of a carrier basket transporter system having one or more of the features disclosed herein, by means of a stabilized carrier basket transporter system having one or more of the features disclosed herein, and further by means of a method of stabilizing a carrier basket in a carrier basket transporter system having one or more of the features disclosed herein.

Advantageous further embodiments of the invention are defined in the description and claims that follow.

According to a first aspect of the present invention, a stabilized carrier basket trolley for motion on a track of a carrier basket transporter system comprises: a support plate; two cars for engaging said track, said track having a track width, said cars being arranged on a first side of the support plate and pivotable relative to the support plate, wherein a distance between said cars is subject to change during traversal of curves along the track, so that during operation a center of the trolley is able to move relative to a center line of the track by a measure towards the inside of a curve in the track; a carrier basket arranged on a second side of the support plate opposite said first side, which carrier basket is pivotably connected to the support plate and free to pivot about a pivot axis that is normal with respect to a plane of the support plate; a gear mechanism for actively compensating a moment acting on the carrier basket during traversal of curves in the track, said gear mechanism comprising: at least one drive wheel; at least one first gear wheel in driving connection with said drive wheel; a second gear wheel that meshes said first gear wheel; wherein said drive wheel and first gear wheel are rotatably mounted on the support plate for rotation around an axis parallel to said pivot axis; wherein said second gear wheel is non-rotatably connected to the carrier basket; and wherein said drive wheel is devised, such that a circumferential surface of the drive wheel comes into contact with a side of the track upon movement of said center of the trolley relative to a center line of the track by said measure, e.g., a center of said drive wheel is located and/or a diameter of said drive wheel is chosen accordingly.

According to a second aspect of the present invention, a stabilized carrier basket transporter system, comprises: a track having a track width and at least one side surface; a trolley for motion on said track, said trolley comprising: a support plate; two cars for engaging said track, said cars being arranged on a first side of the support plate and pivotable relative to the support plate, wherein a distance between said cars is subject to change during traversal of curves along the track, so that during operation a center of the trolley is able to move relative to a center line of the track by a measure towards the inside of a curve in the track; a carrier basket arranged on a second side of the support plate opposite said first side, which carrier basket is pivotably connected to the support plate and free to pivot about a pivot axis that is normal with respect to a plane of the support plate; a gear mechanism for actively compensating a moment acting on the carrier basket during traversal of curves in the track, said gear mechanism comprising: at least one drive wheel; at least one first gear wheel in driving connection with said drive wheel; a second gear wheel that meshes said first gear wheel; wherein said drive wheel and first gear wheel are rotatably mounted on the support plate for rotation around an axis parallel to said pivot axis; wherein said second gear wheel is non-rotatably connected to the carrier basket; and wherein a center of said drive wheel is located and/or a diameter of said drive wheel is chosen such that a circumferential surface of the drive wheel comes into contact with said side surface of the track upon movement of said center of the trolley relative to a center line of the track by said measure.

This is equivalent to saying that a stabilized carrier basket transporter system according to said second aspect of the invention comprises: a track having a track width and at least one side surface; a trolley for motion on said track, said trolley being devised as defined according to said first aspect of the invention and engaging said track with said two cars, wherein a circumferential surface of the drive wheel comes into contact with said side surface of the track upon movement of said center of the trolley relative to a center line of the track by said measure.

According to a third aspect of the present invention, a method of stabilizing a carrier basket in a carrier basket transporter system, comprises: placing a trolley on a track, said track having at least one side surface; conveying said trolley along said track by means of a variable guidance mechanism, in particular according to US 2024/0083684, so that a center of the trolley moves relative to a center line of the track by a measure towards the inside of a curve in the track during conveying; providing said trolley with a pivotably connected carrier basket so that the carrier basket freely pivots about a horizontal pivot axis; actively compensating a moment acting on the carrier basket during traversal of curves in the track by: contacting said side surface of the track upon movement of said center of the trolley relative to a center line of the track by said measure with at least one drive wheel; imparting a movement of said drive wheel, via a gear mechanism, on said carrier basket.

The above-described gear stabilization system can eliminate carrier basket swing and generally comprises said trolley, gears and carrier basket. In a further embodiment, magnets can be used to further stabilize the carrier basket, in particular during motion along portions of the track without any bends or curves.

The system is designed to retain carrier baskets in a horizontal orientation, as biased by the gravitational force, throughout their full path of travel on a carrier basket transporter system, which may consist of inside and outside corners, as well as right and left turns. Horizontal orientation of the carrier baskets is maintained despite changes in momentum acting on the carrier basket, which is otherwise free to rotate about a pivoting connection to the trolley.

In a further embodiment, horizontal orientation can be maintained despite any potentially unequally distributed loads on the carrier basket, which may have several support fingers. To this end, the gear stabilization system may comprise a combination of two mechanisms: one using magnets to maintain the carrier baskets' orientation through any horizontal, vertical, inside turn and outside turn track sections, and another using said gears to maintain the carrier baskets' orientation in right or left curves of the track. The amount of momentum and/or moment about the pivoting axis that this system is able to be overcome depends on the strength of the magnets and the ability of the drive wheel to maintain grip on the side surface of the track.

As outlined in said previous application US 2024/0083684, the trolley is attached to two cars that are guided on/along the track via wheels or any other suitable guiding mechanism (e.g., via glide elements). As a result, the central part of the trolley moves relative to the center line of the track towards the inside of a bend or curve (right or left) during operation. The proposed gear stabilization system makes use of this fact: Advantageously, a drive wheel is installed on each side of the trolley, which causes the wheel that happens to be located on the outside of a given bend or curve to come closer to the track and finally contact a side surface thereof when cornering, thus engaging the drive. Said drive wheels are located so that they do not contact the track when the trolley moves along straight sections of the track.

Preferably, only one drive wheel makes contact with the track at a time and is driven by friction force from the track. In one embodiment, the drive wheels are connected to a respective gear wheel (said first gear or a respective first gear) by a shaft or axle. In another embodiment, the gear mechanism, as defined before, may comprise two small gears (first gears) and one large gear (second gear). The smaller gears are connected to the drive wheels by a respective shaft. The large gear (second gear) is connected to the carrier basket in non-rotatable fashion, e.g., by means of a carrier holder with a special shape adapted to a cut-out in the large gear wheel.

The gear mechanism is designed in such a way that the drive wheel, passing an outer side of the track in a 90-degree turn, rotates the carrier basket proportionately in a direction against the effect of an occurring moment to maintain a horizontal orientation of the carrier basket.

All wheels (gears and drive wheels) are preferably attached to the trolley with bearings, e.g., roller bearings.

In one embodiment, the carrier basket pivotally hangs on one central bearing on the trolley.

In yet another embodiment, in straight sections of the track, both vertical and horizontal, additional stabilization can be realized by means of magnets placed on the support plate at various positions with respect to the pivot axis, e.g., every 90°. The position of the magnets, which interact with the carrier basket and/or the second gear, can prevent the carrier basket from being tilted due to unequal loads.

With such an embodiment, slight gear rotational inaccuracies and/or slippage through the corners is of little concern and need not be compensated, since after exiting from each turn the carrier is leveled again by said magnets. On the other hand, when entering a corner, the drive wheel must overcome the resistance of the magnets.

The following embodiments of the invention have proved particularly useful:

In an embodiment of the trolley according to the present invention, two preferably identical drive wheels and two preferably identical first gears are employed, each first gear in driving connection with a respective one of said drive wheels and meshing said second gear, wherein the two drive wheels are located at diametrically opposite locations with respect to the center of the trolley and the two first gears are located at diametrically opposite locations with respect to the second gear.

In this way, one of the drive wheels is activated, i.e., contacts the track, in left turns whereas the other one is activated during right turns.

In an embodiment of the trolley according to the present invention the first gear or the first gears is/are an external gear/external gears whereas the second gear is an internal gear or an external gear.

This enables various designs adapted to the respective constructional conditions.

In an embodiment of the trolley according to the present invention, in the case of said second gear being an external gear, the support plate comprises a plurality of support rollers that engage an internal circumferential surface of the second gear.

This results in a defined and safely guided rotational movement of the second gear or the carrier basket relative to the support plate.

In an embodiment of the trolley according to the present invention the first gear/s and the second gear are helical gears.

Helical gears offer a refinement over spur gears since the leading edges of the teeth are not parallel to the axis of rotation, but are set at an angle. The angled teeth engage more gradually than do spur gear teeth, causing them to run more smoothly and quietly.

In a highly preferred embodiment of the trolley according to the present invention the support plate comprises at least one magnetic zone and the second gear comprises at least one complementary magnetic zone, preferably either on a circular structure or box that circumferentially surrounds the second gear in the case of an external gear or on an outside of the second gear itself in the case of an internal gear, said complementary magnetic zone extending over a limited portion of the second gear's circumference and being located at a first distance from said pivot axis, said magnetic zone being located at a second distance from said pivot axis, said second distance being greater than or equal to said first distance.

Such an embodiment can be used to achieve the above-mentioned additional stabilization by placing the respective magnetic zones (or magnets) in such a way that they interact magnetically to prevent pivotal motion of the carrier basket when the latter is in its intended horizontal orientation. When going through a curve in the track, the magnetic force will continue to hold the carrier basket in its position until the drive wheel makes contact and activates the gear mechanism.

Here and in the following "magnetic zone" may either describe a magnet, especially a permanent magnet or an electrically powered (solenoid) magnet, or a zone with magnetizable material. A "complementary magnetic zone" describes a suitable counterpart of this so that an attractive magnetic force can act between the two zones.

In a further embodiment of the trolley according to the present invention, in the case of said second distance being equal to said first distance, the magnetic zone is flush with said plane of the support plate.

In other words, the magnetic zones are arranged at a common distance from said pivot axis, but are located in different planes so that they can magnetically interact as intended when they overlap.

In yet a further embodiment of the trolley according to the present invention, in the case of said second distance being greater than said first distance, the magnetic zone is located out of said plane of the support plate.

With such an embodiment, the magnetic zones interact when they are facing one another in a common plane.

In a further embodiment of the trolley according to the present invention, said trolley comprises: a plurality of magnetic zones and a corresponding number of complementary magnetic zones, preferably four, which magnetic zones and complementary magnetic zones, respectively, are most preferably located at equidistant and congruent angular positions around said pivot axis, e.g., with respective intervals of 90°.

This can amplify the magnetic stabilization effect since there are multiple magnetic interaction zones for holding the carrier basket in position.

In yet a further embodiment of the trolley according to the present invention the carrier basket is connected to the support plate such that, in a situation without any motion-induced moment acting on the carrier basket, i.e., when the carrier basket is horizontally levelled and moving along either horizontally or vertically, at least one magnetic zone and at least one complementary magnetic zone overlap or are facing each other, such that there is a stabilizing magnetic force on the carrier basket between said magnetic zone and said complementary magnetic zone.

This has the positive effect of fixing the carrier basket in a particular pivotal orientation, until a holding force derived from said magnetic force is overcome, either by gravity or by the action of said gear mechanism.

In a corresponding further embodiment of the trolley according to the present invention a driving force induced via the drive wheel is devised to overcome a mutual attractive force between said magnetic zone and said complementary magnetic zone.

This can be achieved by suitably choosing a magnetic strength of said magnetic zones relative to the driving force induced by said drive wheel, which will-inter alia-depend on a conveying speed of the trolley and on a frictional force between drive wheel and track.

In another embodiment of the trolley according to the present invention a pivotal connection between the support plate and the carrier basket comprises at least one roller bearing, preferably arranged on the support plate, and a mating connection, preferably arranged on the carrier basket, said mating connection comprises a housing having a part circular track that encloses greater than 180°, and the roller bearing is engaged in the part circular track such that the carrier basket is pivotable by gravity.

In this way, the carrier basket is securely attached to the support plate and a product support surface of the carrier basket is maintained generally horizontal during movement of the carrier basket along the pathway or track.

In yet a further embodiment of the trolley according to the present invention the second gear advantageously comprises a central cut-out, a dimension of which corresponds to a dimension of said housing for engaging said housing, thus achieving said non-rotatable connection between said second gear and said carrier basket by simply placing the second gear on said housing by means of said cut-out.

More preferable, said cut-out and said housing have respective geometries and dimensions that allow mutual engagement only in a limited number of ways, preferably one, for suitably determining and setting an intended relative orientation of the carrier basket and the second gear wheel.

Most preferably, both the cut-out and the housing are of rectangular shape (cross section), with only one of the respective two dimensions (width and length) being compatible. However, the invention is not limited to such geometries.

In still another embodiment of the trolley according to the present invention the drive wheel is devised as a friction wheel, e.g., a rubber or silicone wheel.

This is a very simple way of activating the gear mechanism without excessive wear of noise. If necessary, such a drive wheel can be easily replaced.

In another embodiment of the method according to the present invention, in a situation without any motion-induced moment acting on the carrier basket pivotal movement of the carrier basket is prevented by means of an attractive magnetic force between magnetic zones provided on the carrier basket and on another part of the trolley, respectively.

This can advantageously compensate for unequal loading of the carrier basket, as explained earlier.

In another embodiment of the method according to the present invention said attractive magnetic force are overcome by means of a moment induced by said drive wheel.

This enables active compensation of, e.g., motion-induced swinging movement of the carrier basket.

BRIEF DESCRIPTION OF THE DRAWINGS

Further characteristics and advantages of the invention will become apparent form the following description of exemplary embodiments with reference to the appended drawings.

DETAILED DESCRIPTION

Figure 1:
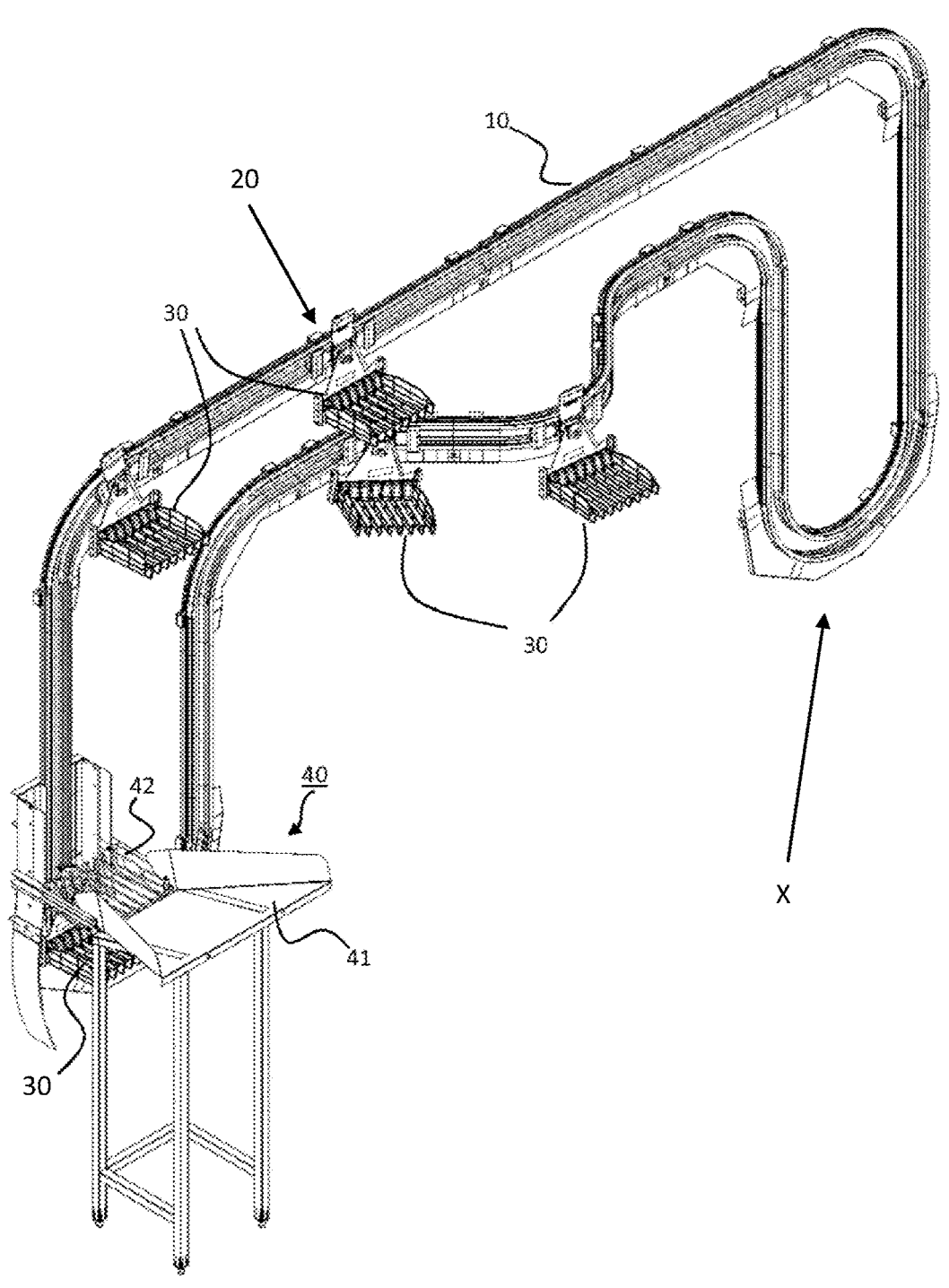
FIG. 1 gives an overview of a carrier basket transporter system as know from the prior art.

FIG. 1 shows an exemplary setup of a conveyor system for the transport of packaged food products. The system uses a profiled track 10 made from lightweight aluminum track sections connected together to form a closed loop. Although this is the preferred configuration, the invention is in principle not limited to a closed loop configuration. The track can be made to snake through the building from a loading point to an unloading point and back again. The track can run horizontally in a straight line, around corners (e.g., at X) and in a vertical direction.

It should be understood that the setup in FIG. 1 is just a simplified example to show the function of the system. More details can be found in EP 3 533 733 A1, which is included by reference.

The profiled track 10 is formed as a kind of longitudinal cage or cage rail for a number of small wheel cars 20 as the one denoted in FIG. 1, which are held on and guided by the profiled track 10. The wheel cars 20 are connected together to form a continuous train of cars. The train of cars 20 in the track system is pulled around by an electric drive system that uses a motor with a direct drive sprocket that engages through a backside opening in the track with teeth (not shown here, cf. FIG. 7) incorporated into the bottom of the cars 20. Other drive systems can be used. The cars 20 need not have wheels but can otherwise slide or glide on the track 10.

The front side of the wheel cars 20 may serve for the attachment of a carrier 30 with a carrier rack or basket on which food products to be transported can be placed. The carrier 30 is pivotably attached to one of the wheel cars 20, so that the carrier can pivot or swing around the pivot pin and thus maintains a horizontal position when travelling along the track, irrespective of the direction of the track.

On the left side of the conveyor system in FIG. 1 is a food loading point 40, which has a funnel-shaped slide 41, which ends on a comb structure 42. A ready and wrapped food item can be placed on the slide 41 and will slip down onto the comb structure 42. A carrier 30, which comes from below, will pick up the item and transport it.

According to the description of FIG. 1, only one car 20 supports carrier (or carrier basket) 30, which might not be enough for transporting heavier weights. US 2004/0083684 therefore proposes to use groups of two cars for supporting each carrier, which approach is also used in the context of the present invention.

In the following FIG. 2 *ff*, embodiments of the present invention are shown that utilize the track system and the basic transportation concept of FIG. 1, as refined in US 2004/0083684, while additionally implementing a stabilization system.

Figure 2:
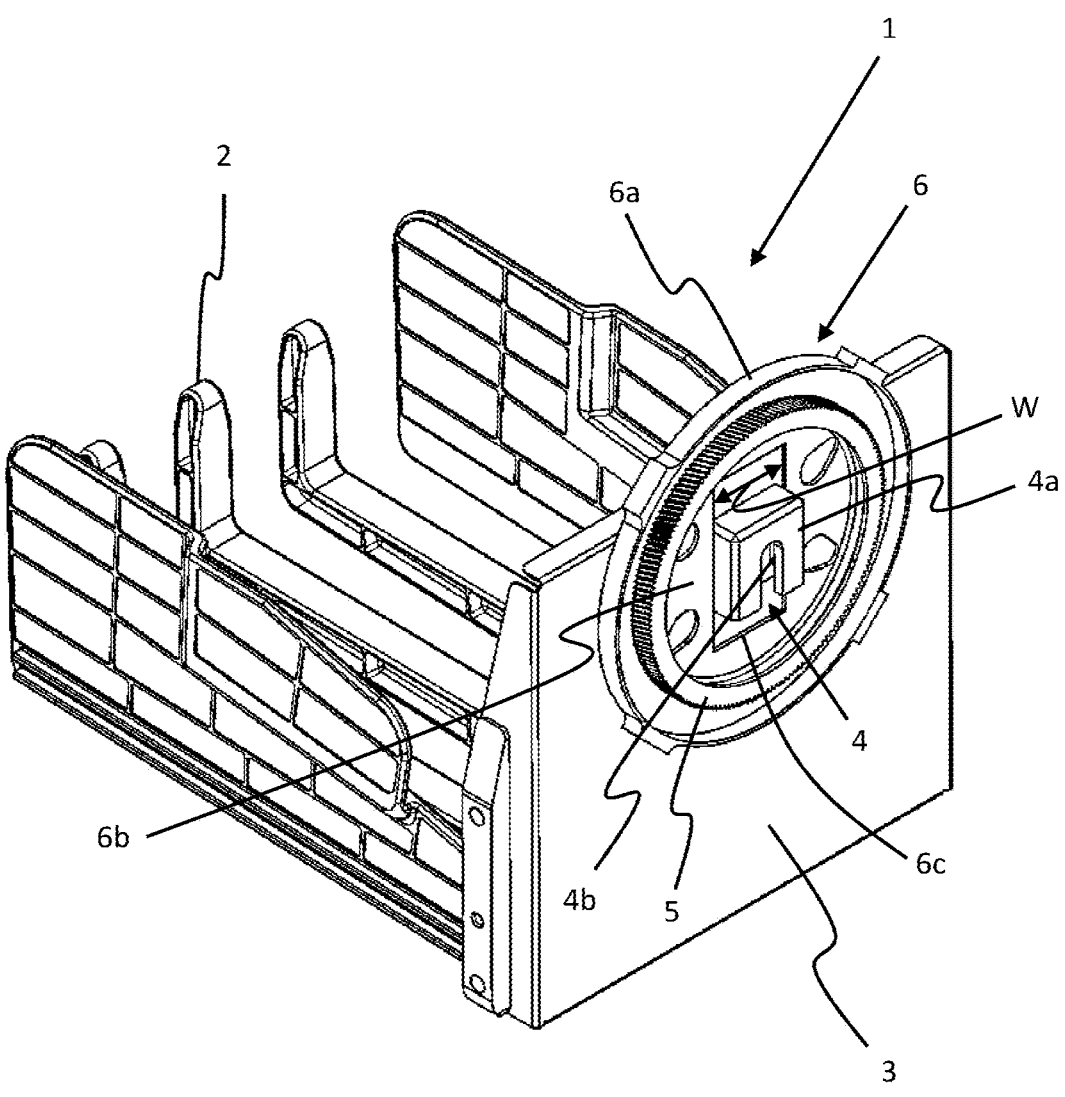
FIG. 2 shows a carrier basket with attached second gear in a perspective view.

FIG. 2 shows a carrier basket 1 that corresponds to the carrier 30 of FIG. 1. Carrier basket 1 has fingers 2 that can interact with comb structure 42 of FIG. 1 for picking up (food) items.

Carrier basket 1 also has a back plate 3 that support a mating connection 4 for establishing a pivotal connection with a trolley support plate, as will be described later on. Said mating connection comprises a housing 4a having a part circular track 4b that encloses greater than 180°, such that a roller bearing (not shown) or a pivot pin, that is part of said trolley support plate, can engage in the part circular track such that the carrier basket is pivotable by gravity. In this way a product support surface defined by the fingers 2 is maintained generally horizontal during movement of the carrier basket along the track.

On back plate 3 is further arranged a (second) helical gear 5 in the form of an external gear or gear wheel that forms (an integral) part of a circular cylindrical box 6 so that it is surrounded, at a constant distance, by a circular structure or wall 6a. In a bottom wall 6b of said box 6, which bottom wall 6b faces the back plate 3, is located a rectangular cut-out 6c, a width W of which corresponds to a width of said housing 4a. In this way, housing 4a can engage cut-out 6c as shown, thus achieving a non-rotatable connection between box 6 and gear 5 on the one hand and carrier basket 1 (via back plate 3) on the other hand. Gear 5 is centered with respect to an axis of the above-mentioned pivotal connection.

The skilled person will realize that cutout 6c need not necessarily be rectangular, but any cutout with a shape preventing a rotation of box 6 with respect to housing 4a could be used.

Figure 3:
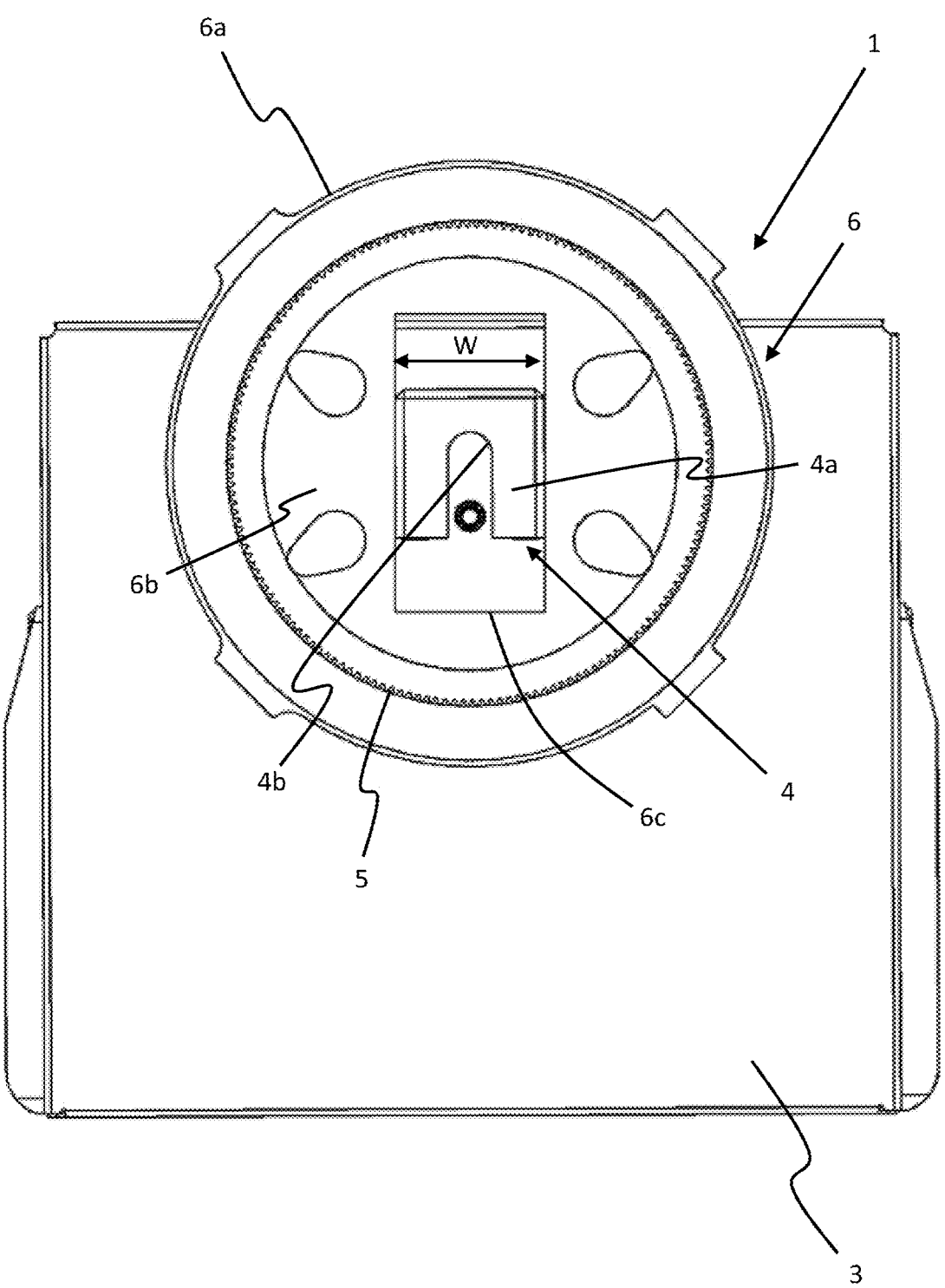
FIG. 3 shows a back view of the carrier basket in FIG. 2.

FIG. 3 is a back view of carrier basket 1. Here and in all of the other drawings, same reference numerals denote same elements or at least elements with similar function.

Figure 4:
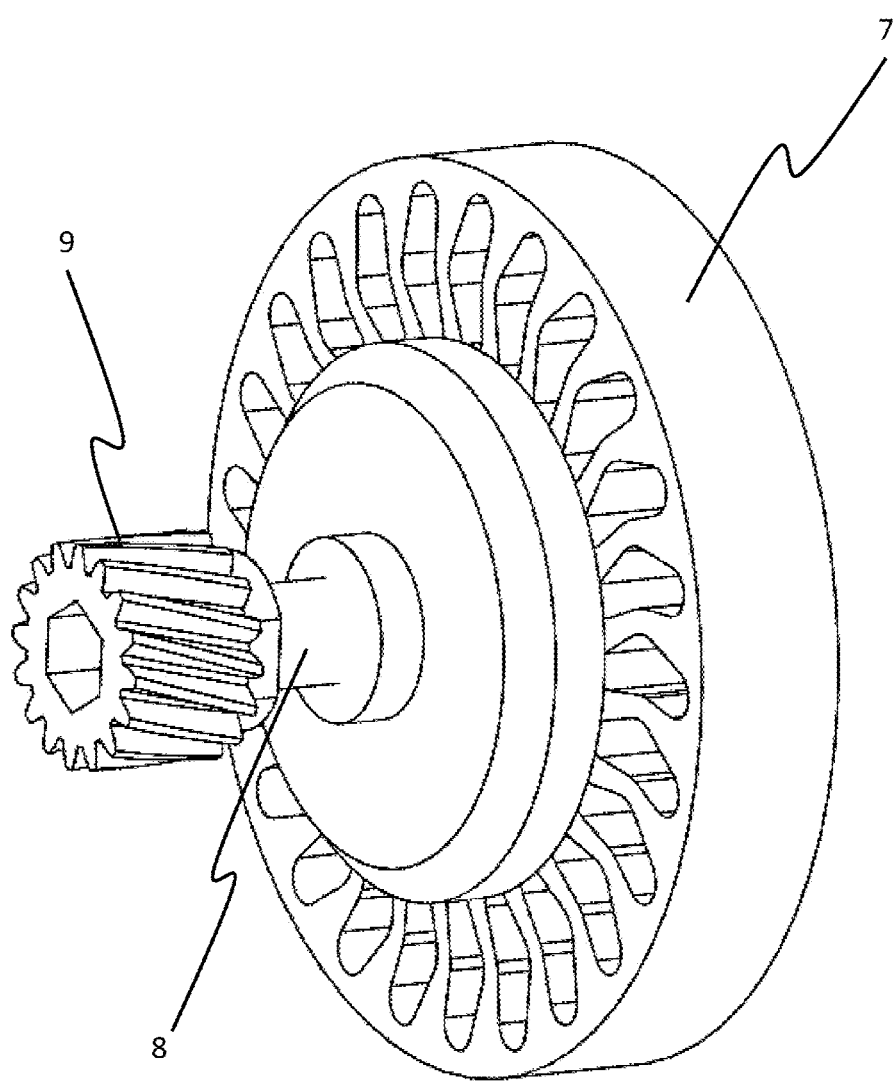
FIG. 4 shows a first gear with shaft and attached drive wheel.

FIG. 4 shows, in a perspective view, a drive wheel 7, preferable made at least in part from rubber or from another elastomeric material, to which drive wheel is connected, by means of a shaft or axle 8, a helical gear 9 (first gear). If said drive wheel 7 is driven, i.e., rotated around an axis of shaft 8 then gear 9 will be likewise rotated.

Figure 5:
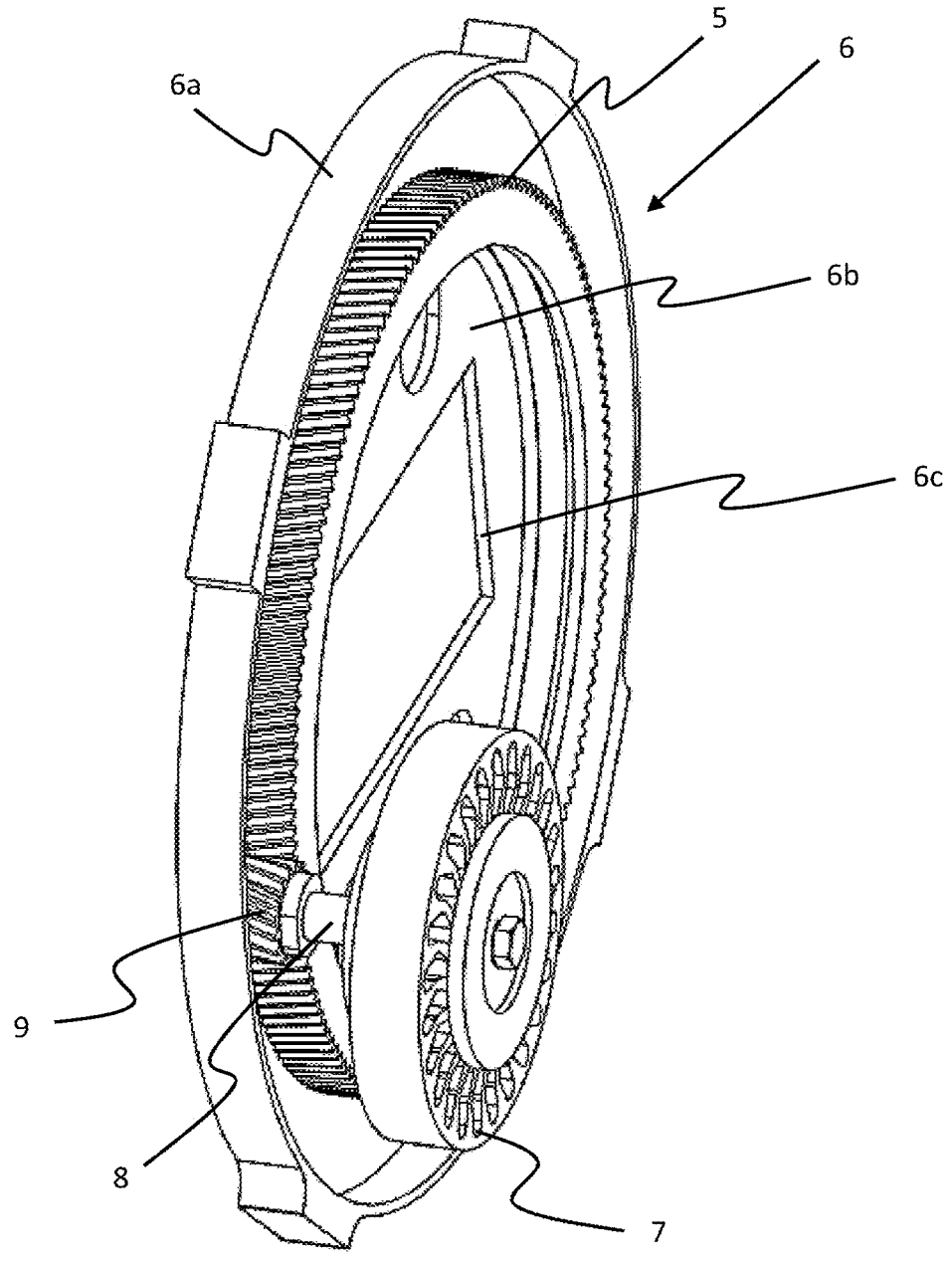
FIG. 5 shows a detail of the gear mechanism.

FIG. 5 illustrates the meshing of first gear 9 (with connected shaft 8 and drive wheel 7) and second gear 5 in a space between second gear 5 and said circumferential wall 6a. If drive wheel 7 is subject to a driving force, said force will be transmitted, via shaft 8 and gear 9 to gear 5, thus rotating also said box 6 and carrier basket 1 (cf. FIGS. 1 and 2) attached to it around said axis of the pivotal connection between carrier basket 1 and its counterpart, cf. below.

The gears 5 and 9 need not be helical, although such an embodiment may be preferred.

Figure 6:
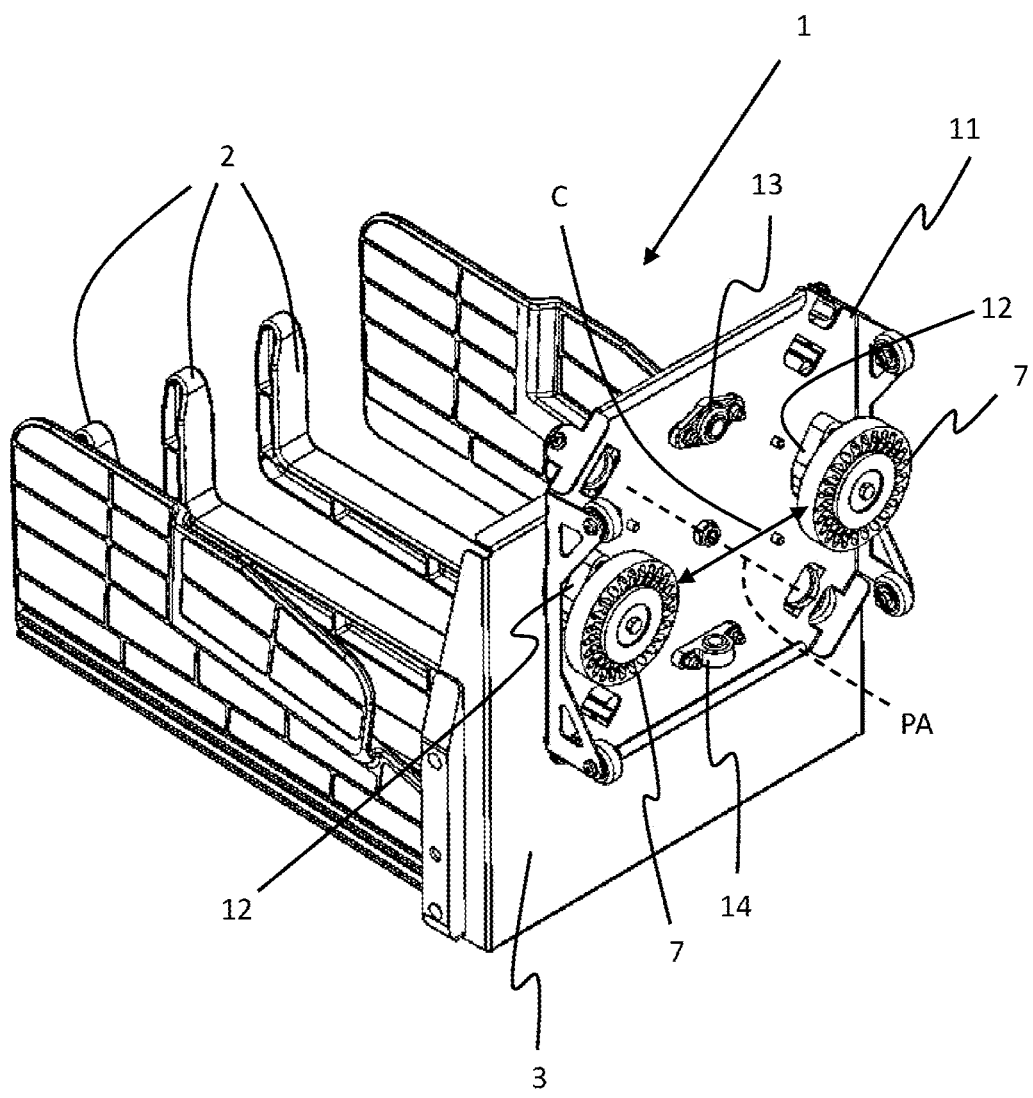
FIG. 6 shows the carrier basket as in FIG. 2 with trolley support plate connected to the back plate via a gear assembly.

FIG. 6 shows the carrier basket 1 as in FIG. 2, but with trolley support plate 11 connected to back plate 3 via the above-described box gear assembly (comprising elements 5 and 6).

Trolley support plate 11 has bearings 12 for supporting a respective shaft (not visible) connected the each of two drive wheels 7 that are arranged with sufficient clearance C therebetween on support plate 11. In particular, said clearance C is larger than a width of track 10, cf. FIG. 1. Support plate 11 also has additional bearings 13, 14 for connecting with two (wheel) cars (not shown) that are intended for guiding the support plate in the form of a trolley along track 10. Said drive wheel shafts extend through support plate 11 so that respective first gears (not visible) can mesh the second gear, as shown in FIG. 5, which second gear is located between support plate 11 and back plate 3.

Reference numeral PA denotes the pivot axis mentioned earlier.

Figure 7:
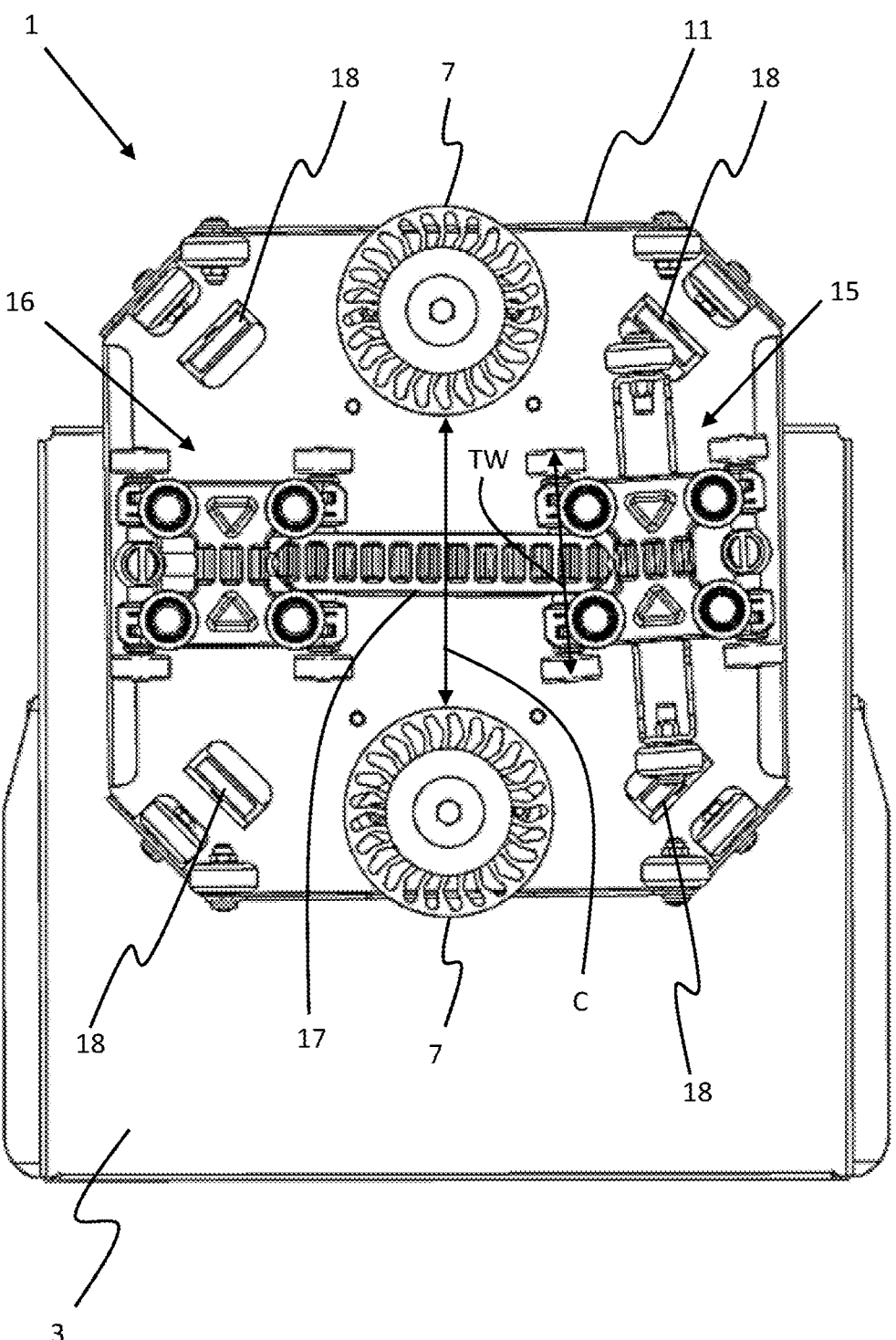
FIG. 7 provides a back view on the assembly of FIG. 6.

FIG. 7 provides a back view on the assembly of FIG. 6 with cars 15, 16 (cf. reference numeral 20 in FIG. 1) as known from EP 3 533 733 A1 and as further described in US 2004/0083684, which cars 15, 16 are attached to said bearings 13, 14 (cf. FIG. 6). As stated before, the support plate 11 is connected to the first car 15 via a pivoting connection and connected to the second car 16 by a pivoting and sliding connection such that the first and second cars 15, 16 are pivotable relative to the support plate 11 and a distance between the first car 15 and the second car 16 can change during traversal of curves along the track. This enables conveying a trolley comprising at least said support plate 11 and said cars 15, 16 along track 10 by means of a variable guidance mechanism, so that a center of the trolley moves sideways relative to a center line of the track 10 towards the inside of a curve in the track by a measure during conveying (cf. FIG. 12).

As further shown in FIG. 7, a flexible connector 17 extends between the first car 15 and the second car 16. This can be formed of a polymeric material, and may have a form with undulations in order to allow flexing and compression or expansion as a distance between the first and second car 15, 16 changes as the group with the two of the cars 15, 16 and the carrier basket support plate 11 traverse horizontal and/or vertical curves (e.g., at "X" in FIG. 1) along the pathway or track 10. Clearance C is bigger than a track width TW of cars 15, 16, so that drive wheels 7 usually will not contact said track when the trolley is moving along a straight track section.

Please note that support plate 11 is rotated through 90° with respect to FIG. 6. This corresponds to horizontal movement while FIG. 6 corresponds to vertical movement.

Reference numerals 18 denote magnets for further stabilization, as will be explained in detail further down. These magnets are located at angular intervals of 90° around the pivot axis PA (cf. FIG. 6) and are arranged slightly behind a plane of support plate 11, i.e., behind the drawing plane of FIG. 7.

Figure 8:
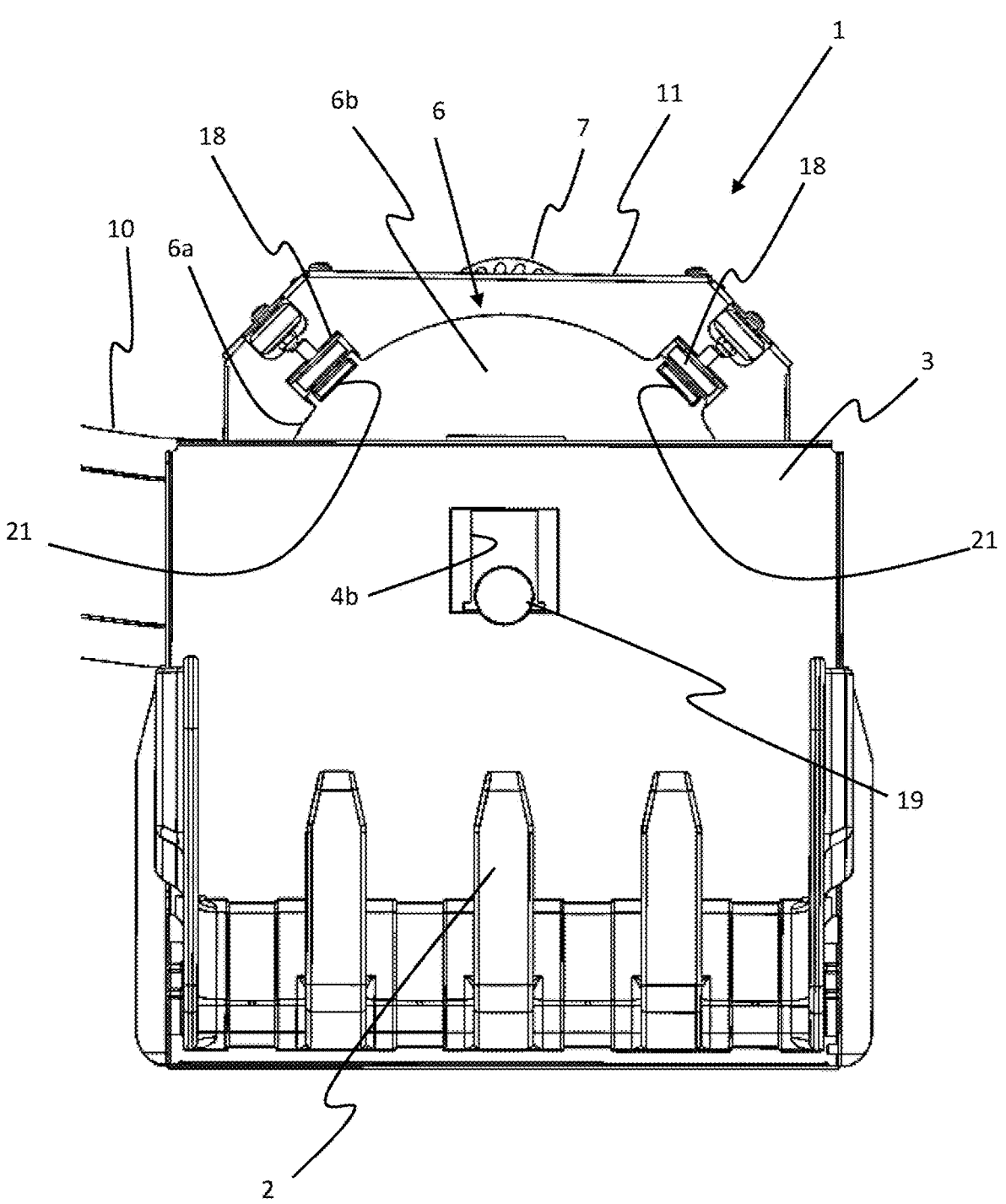
FIG. 8 shows a front view of carrier basket as of FIG. 7.

FIG. 8 shows a front view of carrier basket 1 as of FIG. 7. Reference numeral 10 again denotes said track, as in FIG. 1, which roughly extends in a horizontal direction—at least at a position of the carrier basket 1.

As explained before, carrier basket 1 is pivotally connected to a bearing or a pivot pin provided a support plate 11, and an indexing plunger 19 at the front side serves to lock the pivot connection so that the carrier basket 1 cannot fall off.

Magnets 18 on support plate 11 have been mentioned earlier. According to FIG. 8, their respective circumferential positions around said pivot axis correspond to respective circumferential positions of complementary magnets 21 (or magnetic zones, cf. introductory part) on said box 6, in portions of side wall 6a thereof, which can magnetically interact with said magnets 18 to fix support plate 11 and box 6 in the relative position shown in FIG. 8. Due to the angular arrangement of magnets 18 and 21, box 6 could also be fixed in a position that is rotated through any multiple of 90° with respect to the support plate 11. In this way, box 6 moves in conformity with support plate 11. This accounts for horizontal and vertical movements of the carrier basket 1 along the track 10 and can, in particular, compensate unequal load distributions inside the carrier basket 1, because the carrier basket 1, under the influence of said magnets, will then always be positioned relative to the support plate 11 as shown, e.g., in FIG. 6 for vertical movement (or with support plate 11 rotated by 90° for horizontal movement, cf. FIGS. 7 and 8).

It should be noted that in FIG. 8, the drive wheel(s) 7 do not contact the track 10, i.e., the above-described gear mechanism is not activated. Therefore, if the trolley (support plate 11 with cars 15, 16) moves along the track 10, owing to the magnetic interaction, box 6 will move in conformity. In particular, box 6 will not rotate, but it will keep its horizontal position along a straight part of the track, as shown.

Figure 9:
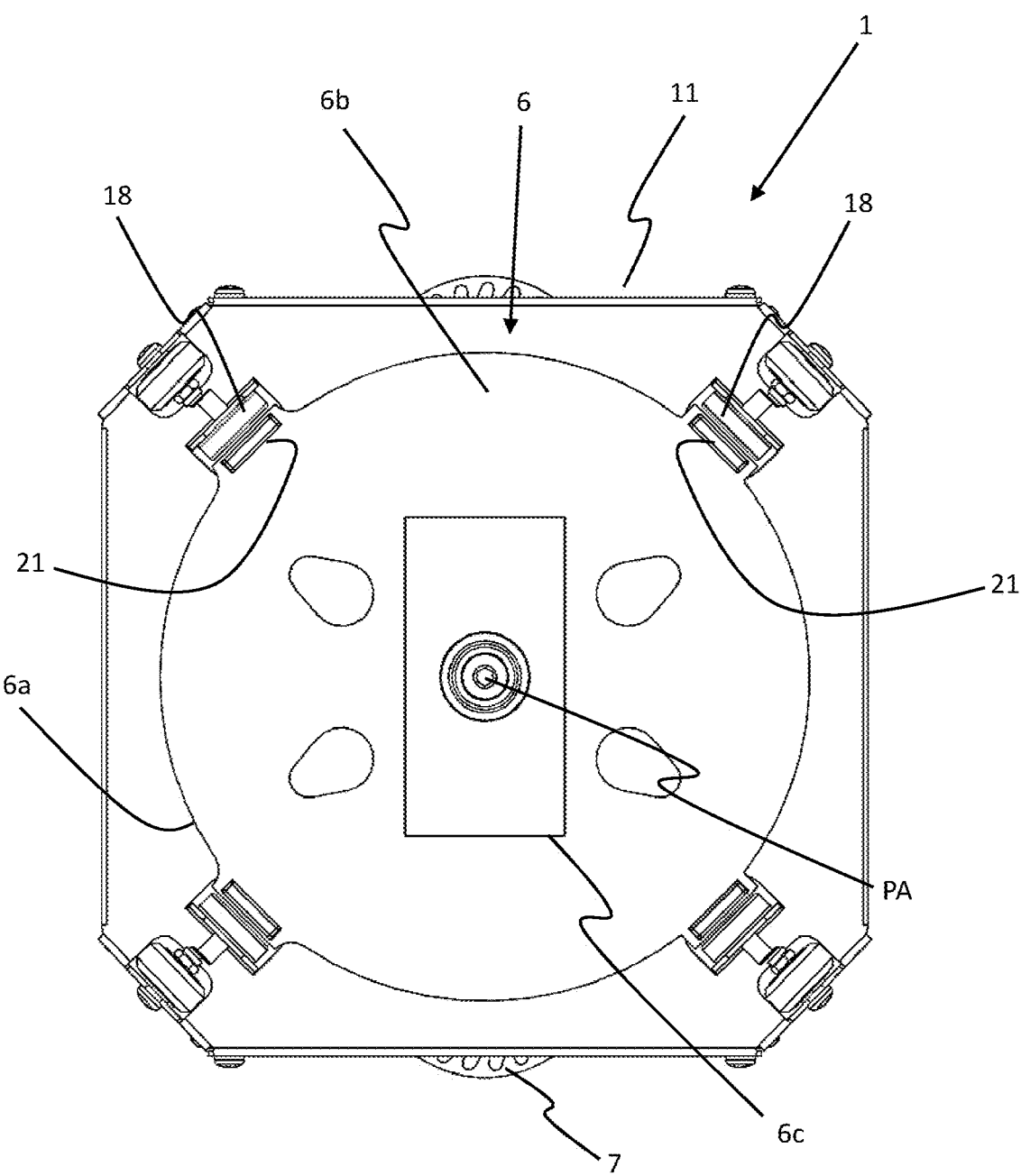
FIG. 9 illustrates magnetic stabilizing interaction between magnets and complementary magnets.

FIG. 9 illustrates this magnetic interaction between magnets 18 and complementary magnets 21 in another view wherein the carrier basket has been omitted for reason of clarity.

Figure 10:
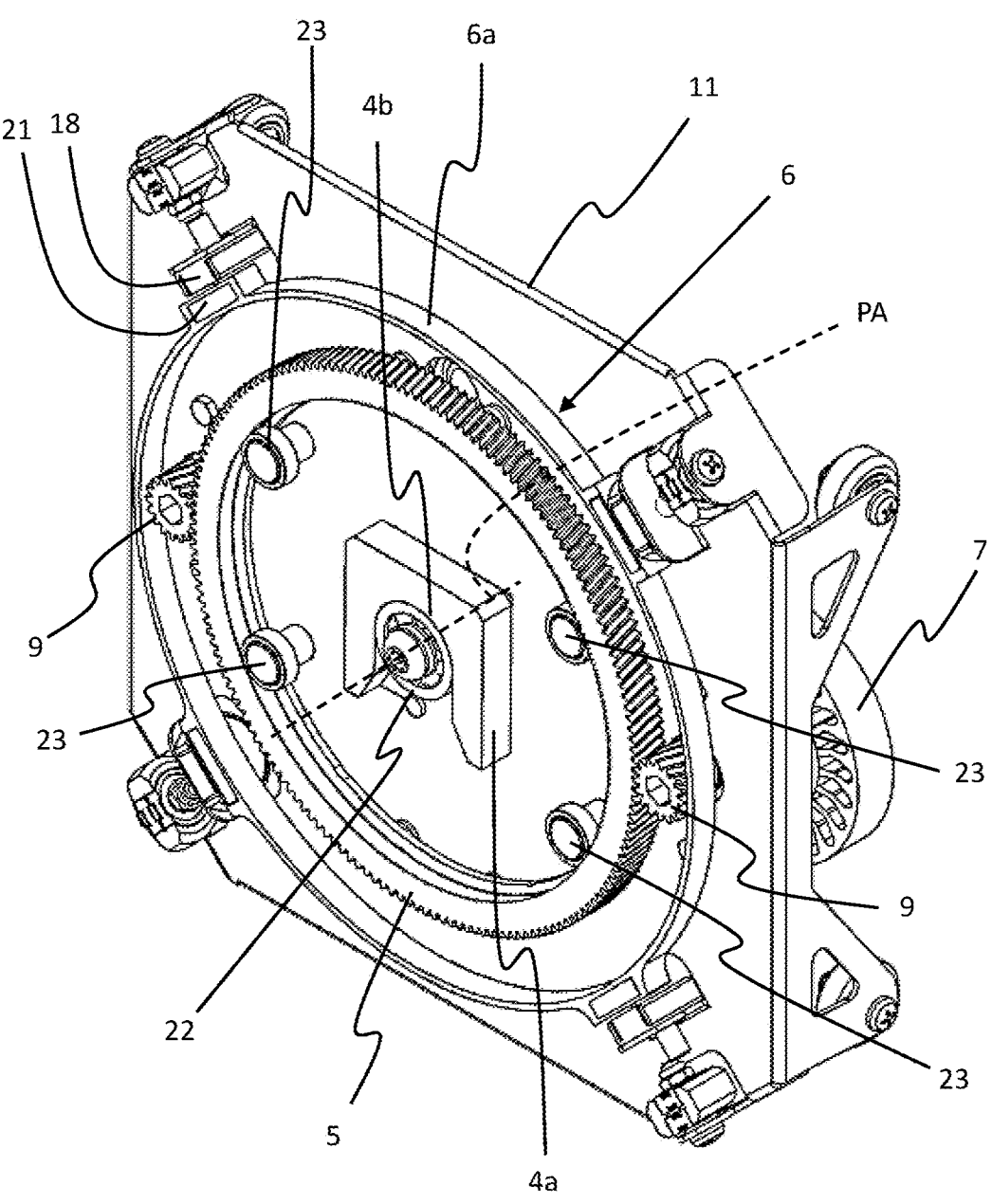
FIG. 10 shows a perspective view of the assembly in FIG. 9.

FIG. 10 shows a perspective view of the assembly in FIG. 9 without bottom wall 6b of box 6 (or in form of a perspective sectional view in the plane of said bottom wall).

As can be seen, both first gears 9 mesh second gear 5 as diametrically opposite sides thereof. The part circular track 4*b* of housing 4*a* on back plate 3 (cf. FIG. 2) engages roller bearing 22 for pivot motion around pivot axis PA. Support plate 11 further comprises four roller pins 23 that engage an inner circumferential track 24 provided on gear 5, thus guiding a rotational motion of gear 5 and box 6 with respect to support plate 11.

As can be gathered from FIG. 10, in the position shown, box 6 (and attached back plate 3 with carrier basket 1, cf. FIGS. 6 to 8) is held in place by magnets 18, 21 relative to support plate 11. Once drive wheel 7 (or the other drive wheel, not shown) is activated, gear 9 transmits its rotational motion to gear 5, and both gear 5 and box 6 plus any attached elements will start to rotate about axis PA if a corresponding moment is strong enough to overcome said magnetic interaction, given that support plate 11 itself cannot rotate since it is guided by the track.

Figure 11:
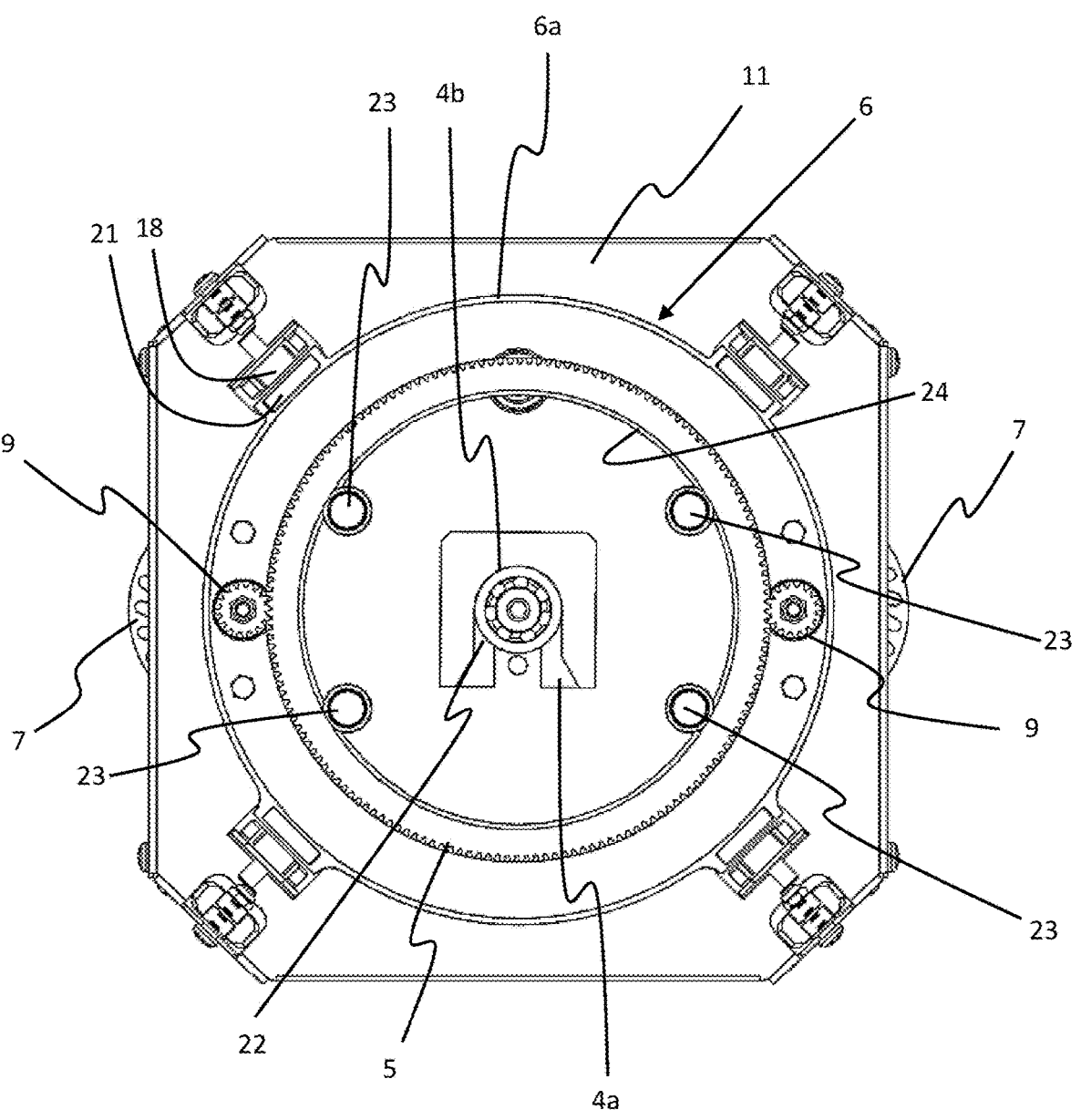
FIG. 11 shows the same assembly as FIG. 10 in a frontal view.

FIG. 11 shows the same assembly as FIG. 10, but in a frontal view along said pivot axis such that both drive wheels are visible.

Figure 12:
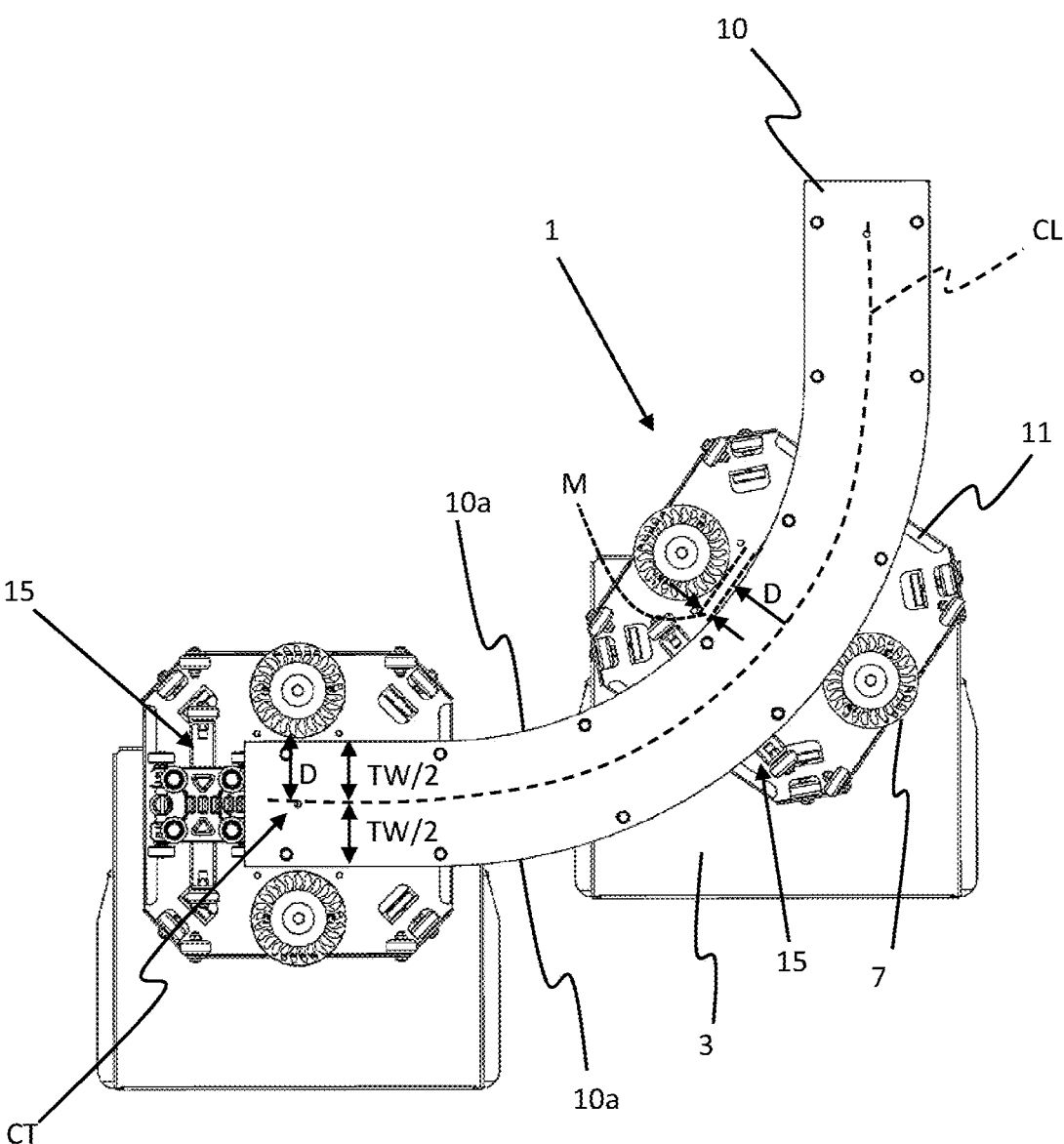
FIG. 12 illustrates activation of the gear stabilizing mechanism when the trolley moves through a curve or a sideways bend in the track.

FIG. 12 illustrates activation of the gear stabilizing mechanism described above when the trolley moves through a curve or a sideways bend in the track 10. On the left-hand side of FIG. 12, the situation is as previously described with reference to FIG. 8. Carrier basket 1 is rotationally fixed relative to support plate 11 by magnetic interaction, which is, however, optional since carrier basket could also be oriented as shown by the effect of gravity alone. Nevertheless, magnetic interaction may compensate for any unequal loading effects, as mentioned. Note that drive wheels 7 are located at a respective distance from the track, i.e., a respective side surface 10*a* thereof. An assumed center CT of the trolley (support plate 11) moves along a center line CL of the track 10, and a distance D of each drive wheel 7 from said center line CL is bigger than a corresponding half track width TW/2 of track 10, i.e., drive wheels 7 do not touch the track 10.

On the right-hand side of FIG. 12 is depicted a situation in which the trolley moves through a curve (from left to right und up, moving in the opposite direction would be possible as well). As explained earlier, a distance between the two cars connected to the support plate is subject to change during traversal of curves along the track, so that during operation said center of the trolley CT moves relative to the track center line CL by a measure M towards the inside of a curve in the track 10, as shown. As a consequence, the outer drive wheel 7 moves towards the track 10 by the same measure M and makes mechanical contact with a side surface 10*a* thereof. As shown in FIG. 12, the track 10 may have a recess along its sides that engages with the drive wheel 7 as shown. However, such recess is not required in the context of the present invention.

In other words: a center of said drive wheel 7 is located and a diameter of said drive wheel 7 is chosen such that a circumferential surface of the drive wheel 7 comes into contact with said side surface 10*a* of the track 10 upon movement of said center CT of the trolley relative to said center line CL of the track 10 by said measure M.

Figure 14:
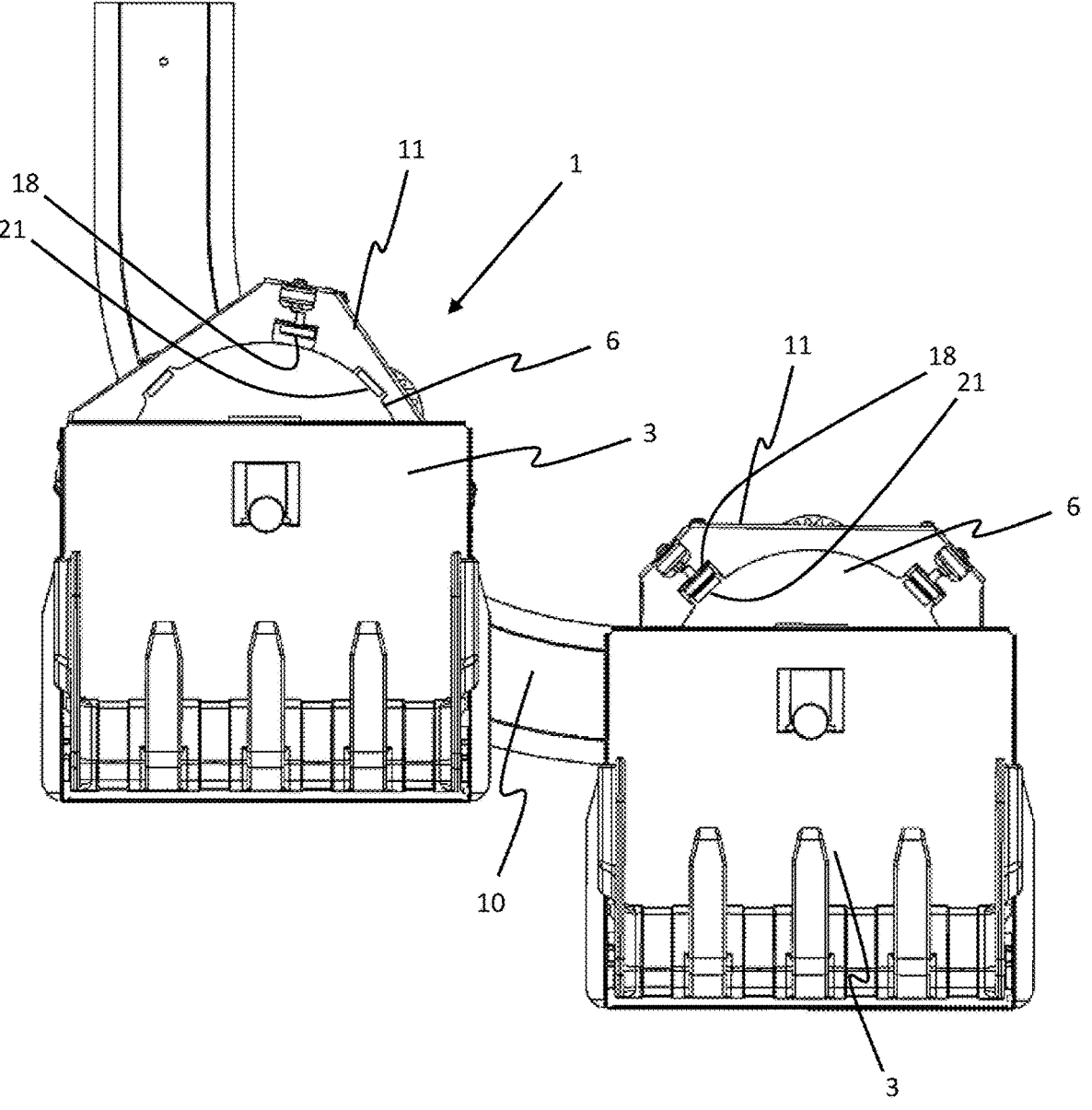
FIG. 14 shows a front view of the situation in FIG. 12.

As explained before, once drive wheel 7 makes contact, motion of the trolley will induce a rotation of said drive wheel 7 which is then transmitted to said first and second gears thus rotating the carrier basket 1 to actively compensate any swinging motion thereof, after having overcome said magnetic interaction, cf. FIG. 14.

At latest once the trolley comes to another straight section of the track 10 (e.g., upper right corner of FIG. 12) the magnets will interact again and further stabilize the carrier basket 1. However, the relative orientations of support plate 11 and back plate 3 will have been rotated by 90° with respect to the configuration on the left of FIG. 12.

Figure 13:
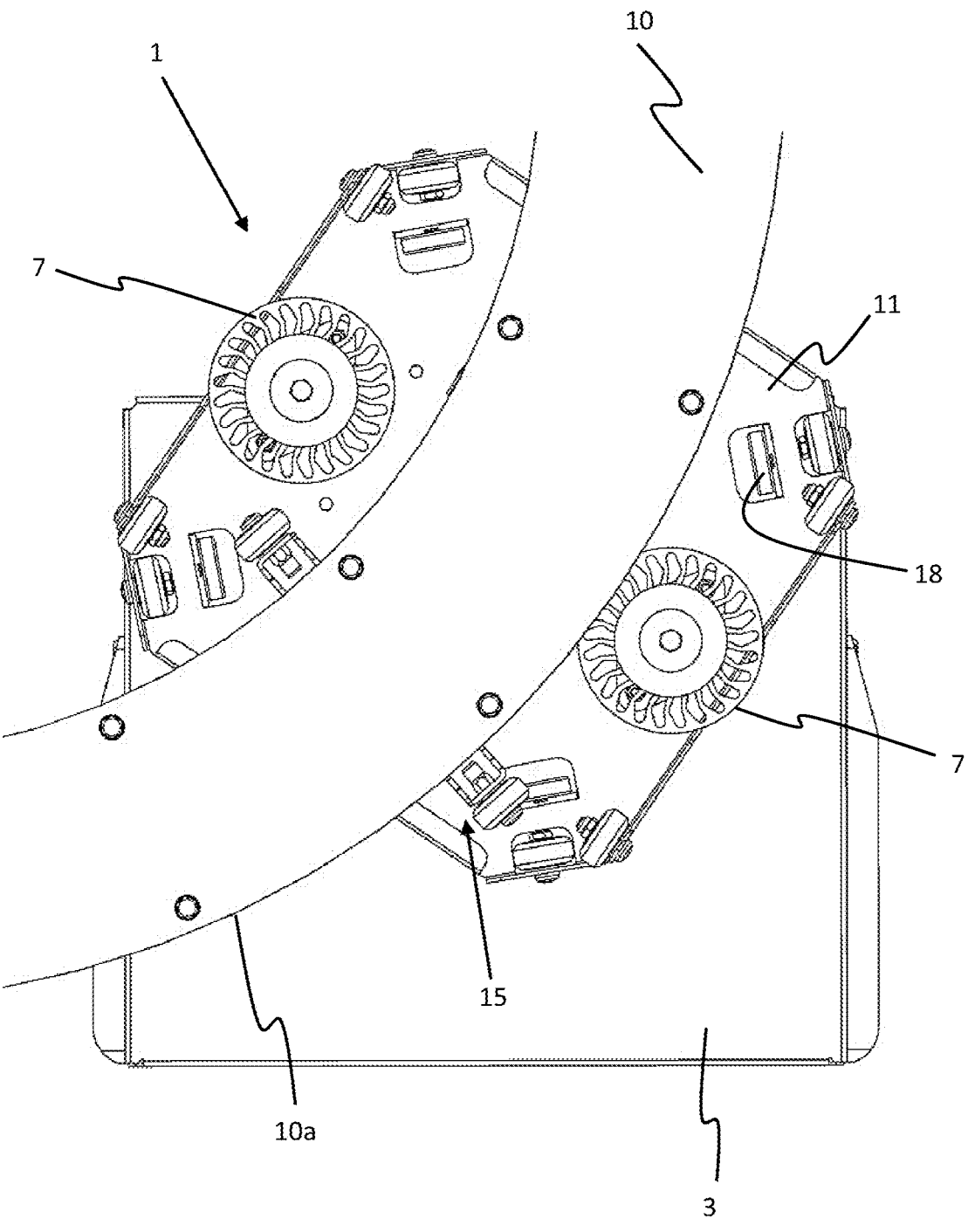
FIG. 13 shows the right-hand side of FIG. 12 in more detail.

FIG. 13 shows the right-hand side of FIG. 12 in more detail. As can be easily gathered from said drawing, the magnets 21 (cf. FIG. 11) have been disengaged from magnets 18 because support plate 11 has rotated with respect to back plate 3, or vice versa.

FIG. 14 shows the same situation as in FIG. 12, but from the other side (front view). Magnets 18, 21 are engaged (right hand side) during horizontal motion and disengaged (left hand side) during curve motion.

Figure 15:
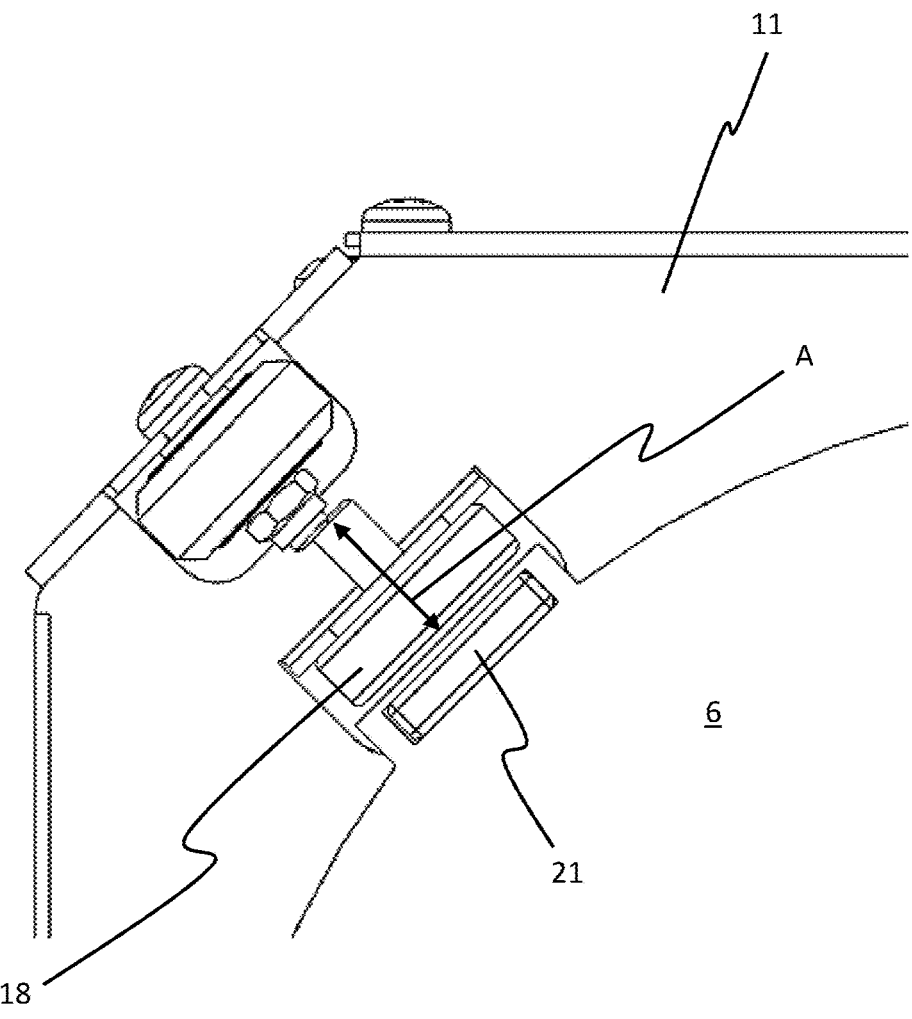
FIG. 15 provides an enlarged view of the magnets.

FIG. 15 provides an enlarged view of the magnets 18 and complementary magnets 21 described earlier. As stated before, they could also be arranged in overlapping fashion when looking in a direction of the pivot axis. The arrangement shown has the advantage that a distance between the magnets and thus their interaction can be easily adjusted by moving magnet 18 in direction of arrow A.

The invention claimed is:

1. A stabilized carrier basket trolley for motion on a track (10) of a carrier basket transporter system, said trolley comprising:

a support plate (11);

two cars (15, 16) for engaging said track (10), said track (10) having a track width (TW), said cars (15, 16) being arranged on a first side of the support plate (11) and pivotable relative to the support plate (11), wherein a distance between said cars (15, 16) is subject to change during traversal of curves along the track (10), so that during operation a center (CT) of the trolley is moveable relative to a center line (CL) of the track (10) by a measure (M) towards an inside of a curve in the track (10);

a carrier basket (1) arranged on a second side of the support plate (11) opposite said first side, the carrier basket (1) is pivotably connected to the support plate (11) and free to pivot about a pivot axis (PA) that is normal with respect to a plane of the support plate (11);

said trolley further comprises a gear mechanism for actively compensating a moment acting on the carrier basket (1) during traversal of curves in the track (10), said gear mechanism comprising:

at least one drive wheel (7);

at least one first gear (9) in driving connection with said drive wheel (7);

a second gear (5) that meshes said first gear wheel (9);

wherein said at least one drive wheel (7) and the at least one first gear (9) are rotatably mounted on the support plate (11) for rotation around an axis parallel to said pivot axis (PA);

wherein said second gear (5) is non-rotatably connected to the carrier basket (1); and wherein said drive wheel (7) includes a circumferential surface that comes into contact with a side of the track upon movement of said center (CT) of the trolley relative to a center line (CL) of the track (10) by said measure (M).

2. The trolley of claim 1, wherein the at least one drive wheel (7) comprises two of the drive wheels (7) and the at least one first gear (9) comprises two of the first gears (9), each said first gear (9) is in driving connection with a respective one of said drive wheels (7) and meshing said second gear (5), and the two drive wheels (7) are located at diametrically opposite locations with respect to the center (CT) of the trolley and the two first gears (9) are located at diametrically opposite locations with respect to the second gear (5).

3. The trolley of claim 1, wherein the at least one first gear (9) is an external gear and the second gear (5) is an internal gear or an external gear.

4. The trolley of claim 3, wherein said second gear (5) is the external gear, and the support plate (11) comprises a plurality of support rollers (23) that engage an internal circumferential track (24) of the second gear (5).

5. The trolley of claim 1, wherein the at least one first gear (9) and the second gear (5) are helical gears.

6. The trolley of claim 1, wherein the support plate (11) comprises at least one magnetic zone (18) and the second gear (5) comprises at least one complementary magnetic zone (21), said complementary magnetic zone (21) extending over a limited portion of a circumference of the second gear and being located at a first distance from said pivot axis (PA), said at least one magnetic zone (18) being located at a second distance from said pivot axis (PA), said second distance being greater than or equal to said first distance.

7. The trolley of claim 6, wherein for said second distance being equal to said first distance, the at least one magnetic zone (18) is flush with said plane of the support plate (11).

8. The trolley of claim 6, wherein for said second distance being greater than said first distance, the at least one magnetic zone (18) is located out of said plane of the support plate (11).

9. The trolley of claim 6, wherein the at least one magnetic zone (18) comprises a plurality of the magnetic zones (18) and a corresponding number of the complementary magnetic zones (21), said magnetic zones (18) and said complementary magnetic zones (21), respectively, are located at equidistant and congruent angular positions around said pivot axis (PA).

10. The trolley of claim 6, wherein the carrier basket (1) is connected to the support plate (11) such that, in a situation without any motion-induced moment acting on the carrier basket, the at least one magnetic zone (18) and the complementary magnetic zone (21) overlap or are facing each other, such that there is a stabilizing magnetic force on the carrier basket (1) between said at least one magnetic zone (18) and said complementary magnetic zone (21).

11. The trolley of claim 6, wherein a driving force induced via the drive wheel (7) is able to overcome a mutual attractive force between said at least one magnetic zone (18) and said complementary magnetic zone (21).

12. The trolley of claim 1, further comprising a pivotal connection between the support plate (11) and the carrier basket (1) which comprises at least one roller bearing (22) and a mating connection (4), said mating connection (4) comprises a housing (4a) having a part circular track (4b) that encloses greater than 180°, and the roller bearing (22) is engaged in the part circular track (4b) such that the carrier basket (1) is pivotable by gravity.

13. The trolley of claim 12, wherein the second gear (5) comprises a central cut-out (6c), a dimension (W) of the central cut-out (6c) corresponds to a dimension of said housing (4a) for engaging said housing (4a), to provide said non-rotatable connection between said second gear (5), and said carrier basket (1).

14. The trolley of claim 1, wherein the drive wheel (7) comprises a friction wheel.

15. A stabilized carrier basket transporter system, comprising:
   a track (10) having a track width (TW) and at least one side surface (10a);
   a trolley according to claim 1 for motion on and engaging said track (10) with said two cars (15, 16), wherein a circumferential surface of the drive wheel (7) comes into contact with said side surface (10a) of the track (10) upon movement of said center (CT) of the trolley relative to the center line (CL) of the track (10) by said measure (M).

16. A method of stabilizing a carrier basket (1) in a carrier basket transporter system, comprising:
   placing a trolley on a track (10), said track (10) having at least one side surface (10a);
   conveying said trolley along said track (10) by a variable guidance mechanism, so that a center (CT) of the trolley moves relative to a center line (CL) of the track (10) by a measure (M) towards an inside of a curve in the track (10) during conveying;
   providing said trolley with a pivotably connected carrier basket (1) so that the carrier basket (1) freely pivots about a horizontal pivot axis (PA);
   actively compensating a moment acting on the carrier basket (1) during traversal of curves in the track (10) by:
   contacting said side surface (10a) of the track (10) upon movement of said center (CT) of the trolley relative to a center line (CL) of the track (10) by said measure (M) with at least one drive wheel (7); and
   imparting a movement of said drive wheel (7), via a gear mechanism, on said carrier basket (1).

17. The method of claim 16, further comprising:
   in a situation without any motion-induced moment acting on the carrier basket (1), preventing pivotal movement of the carrier basket (1) by an attractive magnetic force between magnetic zones (18, 21) provided on the carrier basket (1) and on another part of the trolley, respectively.

18. The method of claim 17, further comprising:
   overcoming said attractive magnetic force by a moment induced by said drive wheel (7).

* * * * *